(12) United States Patent
Lin et al.

(10) Patent No.: US 12,596,419 B2
(45) Date of Patent: Apr. 7, 2026

(54) COMPUTER HOST AND POWER CONTROL METHOD THEREOF

(71) Applicant: ASUSTEK COMPUTER INC., Taipei (TW)

(72) Inventors: Zheng-Wei Lin, Taipei (TW); Kuo-Chen Huang, Taipei (TW); Jhan-Kai Wang, Taipei (TW); Yu-Sheng Yang, Taipei (TW)

(73) Assignee: ASUSTEK COMPUTER INC., Taipei (TW)

( * ) Notice: Subject to any disclaimer, the term of this patent is extended or adjusted under 35 U.S.C. 154(b) by 134 days.

(21) Appl. No.: 18/772,760

(22) Filed: Jul. 15, 2024

(65) Prior Publication Data

US 2025/0315088 A1 Oct. 9, 2025

(30) Foreign Application Priority Data

Apr. 9, 2024 (TW) ................................. 113113408

(51) Int. Cl.
| | |
|---|---|
| *G06F 1/26* | (2006.01) |
| *G06F 1/28* | (2006.01) |
| G06F 13/42 | (2006.01) |

(52) U.S. Cl.
CPC ................ *G06F 1/266* (2013.01); *G06F 1/28* (2013.01); *G06F 13/4282* (2013.01); *G06F 2213/0026* (2013.01)

(58) Field of Classification Search
CPC ... G06F 1/32; G06F 1/266; G06F 1/28; G06F 13/4282; G06F 2213/0026
See application file for complete search history.

(56) References Cited

U.S. PATENT DOCUMENTS

2012/0030489 A1* 2/2012 Patil .......................... G06F 1/26
713/323
2017/0286846 A1* 10/2017 Hawkins ................ G06N 3/047

FOREIGN PATENT DOCUMENTS

| JP | 2000-020187 A | 1/2000 |
|---|---|---|
| JP | 2006-155256 A | 6/2006 |
| JP | 2007-533010 A | 11/2007 |
| JP | 2008-219513 A | 9/2008 |
| JP | 2018-181115 A | 11/2018 |
| TW | 201706771 A | 2/2017 |

(Continued)

*Primary Examiner* — Keshab R Pandey
(74) *Attorney, Agent, or Firm* — MUNCY, GEISSLER, OLDS & LOWE, P.C.

(57) ABSTRACT

A computer host is provided, including a motherboard and a power supply. The power supply is adapted to supply power to the motherboard through a first power line and supply power to a graphics card through a second power line, and includes a rectifying element and a feedback control unit. The rectifying element controls the power supply to generate output power according to a feedback signal. The feedback control unit includes a first feedback input end and a second feedback input end, where the first feedback input end is adapted to be electrically coupled to the first power line to receive a first detection voltage, and the second feedback input end is adapted to be electrically coupled to the second power line to receive a second detection voltage. The feedback control unit selectively generates, according to an electrical coupling state between the power supply and the graphics card, the feedback signal according to the first detection voltage or the second detection voltage.

13 Claims, 9 Drawing Sheets

(56)         References Cited

FOREIGN PATENT DOCUMENTS

| | | | |
|---|---|---|---|
| TW | I571028 | B | 2/2017 |
| TW | M552608 | U | 12/2017 |

* cited by examiner

COMPUTER HOST AND POWER CONTROL METHOD THEREOF

CROSS-REFERENCE TO RELATED APPLICATION

This application claims the priority benefit of Taiwan Application Serial No. 113113408, filed on Apr. 9, 2024. The entirety of the above-mentioned patent application is hereby incorporated by reference herein and made a part of the specification.

BACKGROUND OF THE INVENTION

Field of the Invention

The disclosure relates to a power management technology, and in particular, to a computer host and a power control method thereof.

Description of the Related Art

A power supply of a computer host is configured to convert a mains supply (generally a 100V to 250V alternating current) into a direct current voltage for use of a motherboard and other computer components such as a graphics card, a processor, a hard disk, and a fan. In recent years, as performance of the graphics card improves, an additional power supply circuit is added to most power supplies to specifically supply power to the graphics card.

However, a conventional power supply is controlled according to a feedback signal from the motherboard. As power consumption of the graphics card increases and even exceeds that of the motherboard, this feedback control manner is likely to cause a poor voltage stability of the graphics card, and even affects an overall stability of a computer system.

BRIEF SUMMARY OF THE INVENTION

The disclosure provides a computer host, suitable for installing a graphics card. The computer host includes a motherboard and a power supply. The motherboard includes a graphics card slot suitable for insertion of the graphics card. The power supply is adapted to supply power to the motherboard through a first power line and supply power to the graphics card through a second power line, and includes a rectifying element and a feedback control unit. The rectifying element controls the power supply to generate output power according to a feedback signal. The feedback control unit includes a first feedback input end and a second feedback input end, where the first feedback input end is adapted to be electrically coupled to the first power line to receive a first detection voltage, and the second feedback input end is adapted to be electrically coupled to the second power line to receive a second detection voltage. The feedback control unit selectively generates, according to an electrical coupling state between the power supply and the graphics card, the feedback signal according to the first detection voltage or the second detection voltage.

The disclosure further provides a power control method, applicable to a computer host. The computer host includes a motherboard and a power supply. The motherboard includes a graphics card slot suitable for insertion of a graphics card. The power supply is adapted to supply power to the motherboard through a first power line and supply power to the graphics card through a second power line, and the power supply includes a rectifying element and a feedback control unit. The rectifying element controls the power supply to generate output power according to a feedback signal. The feedback control unit includes a first feedback input end and a second feedback input end, where the first feedback input end is adapted to be electrically coupled to the first power line to receive a first detection voltage, and the second feedback input end is adapted to be electrically coupled to the second power line to receive a second detection voltage. The power control method includes: determining whether the second power line is electrically coupled to the graphics card; when it is determined that the second power line is electrically coupled to the graphics card, generating the feedback signal according to the second detection voltage; and when it is determined that the second power line is not electrically coupled to the graphics card, generating the feedback signal according to the first detection voltage.

According to the computer host and the power control method provided in the disclosure, the feedback control unit of the power supply determines, according to whether the power supply is electrically coupled to the graphics card, whether to generate the feedback signal according to the first detection voltage or the second detection voltage. In this way, the problems of a poor voltage stability of the graphics card and a poor stability of a computer system that are easily caused in the conventional control manner are alleviated.

DETAILED DESCRIPTION OF THE EMBODIMENTS

The following describes specific embodiments of the disclosure in more detail with reference to the schematic diagrams. Based on the following description and claims, advantages and features of the disclosure will be clearer. It is to be noted that, the accompanying drawings are all in simplified forms and are not drawn to an accurate scale, and are only used for assisting in understanding the embodiments of the disclosure conveniently and clearly.

Figure 1A:
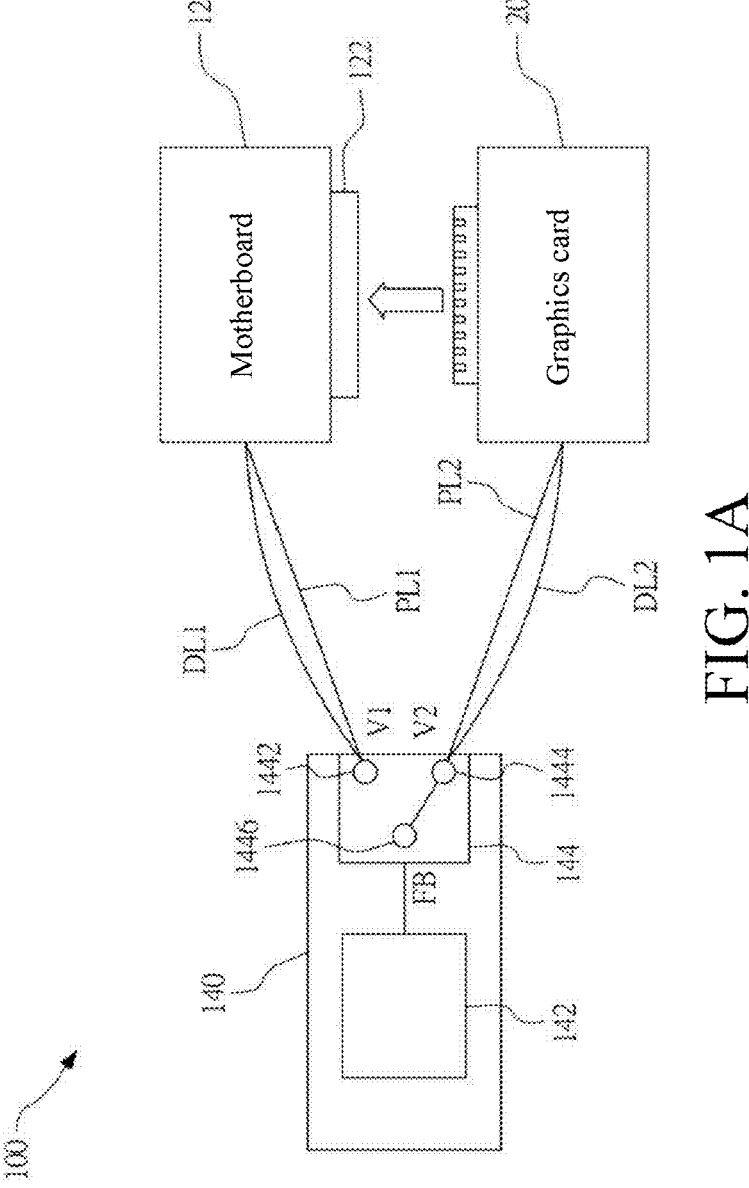
FIG. 1A and FIG. 1B are schematic block diagrams of a computer host according to an embodiment of the disclosure.
Figure 1B:
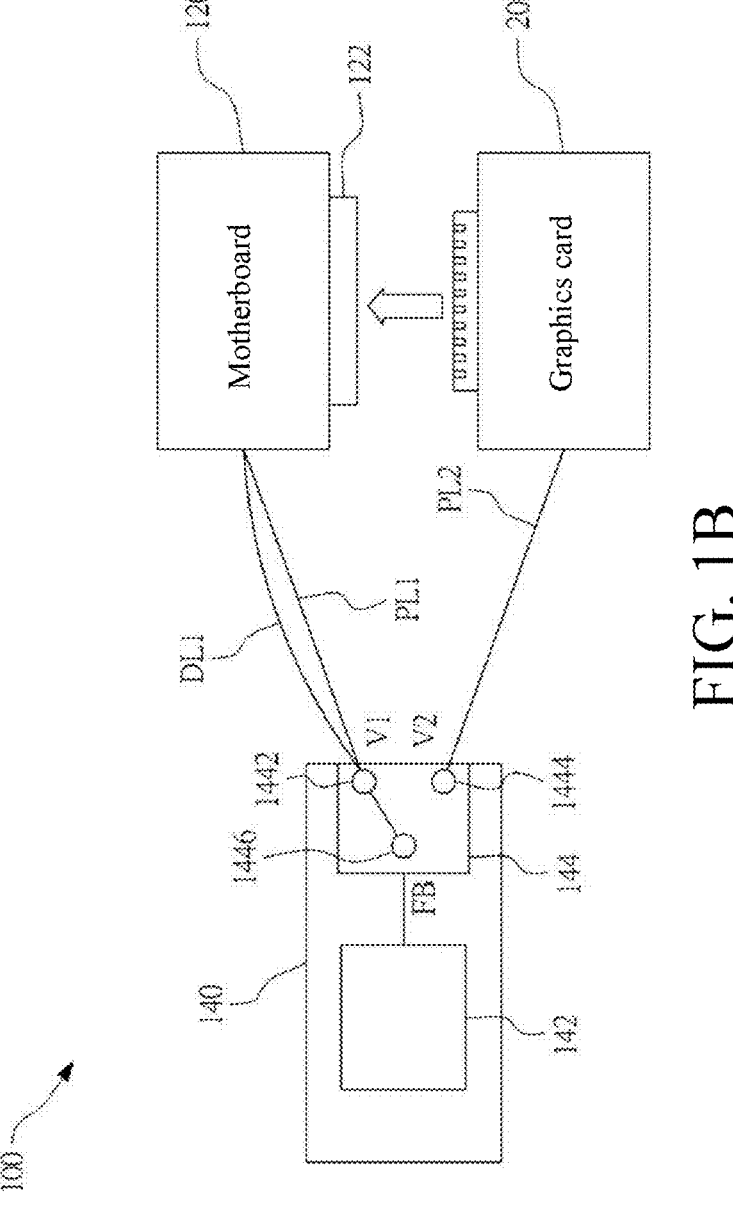

FIG. 1A and FIG. 1B are schematic block diagrams of a computer host according to an embodiment of the disclosure. A computer host 100 is suitable for installing a graphics card 200.

As shown in the figures, the computer host 100 includes a motherboard 120 and a power supply 140, where the motherboard 120 includes a graphics card slot 122 suitable for insertion of a graphics card 200. In an embodiment, the graphics card 200 is a PCIE graphics card. The graphics card slot 122 on the motherboard 120 is a PCIE slot.

The power supply 140 is adapted to supply power to the motherboard 120 through a first power line PL1 and supply power to the graphics card 200 through a second power line PL2. In an embodiment, the first power line PL1 is a 24 pin power supply line commonly used by the motherboard 120, and the second power line PL2 is a PCIE power supply line. A detection line DL1 is connected between the power supply 140 and the motherboard 120, and a detection line DL2 is connected between the power supply 140 and the graphics card. The detection line DL1 and the detection line DL2 are electrically coupled to the first power line PL1 and the second power line PL2 and are configured to generate a first detection voltage V1 and a second detection voltage V2 respectively.

The power supply 140 includes a rectifying element 142 and a feedback control unit 144. The rectifying element 142 controls the power supply 140 to generate output power according to a feedback signal FB. In an embodiment, the rectifying element 142 is a switchable rectifier, and the feedback signal FB is a feedback voltage signal. The switchable rectifier adjusts a conduction state of a switching element according to a voltage level of the feedback voltage signal to adjust the output power of the power supply 140. In an embodiment, the feedback signal FB is compensated by adjusting an output current of the power supply 140.

The feedback control unit 144 includes a first feedback input end 1442, a second feedback input end 1444, and a feedback output end 1446. The first feedback input end 1442 is adapted to be electrically coupled to the first power line PL1 to receive the first detection voltage V1, and the second feedback input end 1444 is adapted to be electrically coupled to the second power line PL2 to receive the second detection voltage.

The feedback control unit 144 selectively generates, according to an electrical coupling state between the power supply 140 and the graphics card 200, that is, according to an electrical coupling state between the second power line PL2 and the graphics card 200, the feedback signal FB according to the first detection voltage V1 or the second detection voltage, and provides the feedback signal FB to the rectifying element 142 through the feedback output end 1446.

As shown in FIG. 1A, when the feedback control unit 144 detects a high-potential first detection voltage V1 and a high-potential second detection voltage V2 simultaneously, the feedback control unit 144 determines that the first power line PL1 and the second power line PL2 are respectively and correctly connected to the motherboard 120 and the graphics card 200 to supply power. In this case, the feedback control unit 144 generates the feedback signal FB according to the second detection voltage V2 and provides the feedback signal FB to the rectifying element 142.

As shown in FIG. 1B, when the detection line DL2 corresponding to the second power line PL2 is not connected to the graphics card 200 or the power supply 140, the feedback control unit 144 only detects the high-potential first detection voltage V1, but does not detect the second detection voltage V2. In this case, the feedback control unit 144 instead generates the feedback signal FB according to the first detection voltage V1 and provides the feedback signal FB to the rectifying element 142. This case also occurs when the graphics card 140 is not arranged or the second power line PL2 is not connected to the graphics card 140.

In an embodiment, the feedback control unit 144 includes a multiplexer. The multiplexer selectively generates, according to a selection signal, the feedback signal FB according to the first detection voltage V1 or the second detection voltage V2. A potential of the selection signal corresponds to a potential of the second feedback input end 1444. In other words, the second detection voltage V2 is used as the selection signal.

Specifically, the first detection voltage V1 and the second detection voltage V2 are used as inputs of the multiplexer. When the selection signal (or the second detection voltage V2) is at a high potential, it indicates that the graphics card 200 is electrically connected to the power supply 140 through the second power line PL2. The multiplexer generates a high-potential output signal, to indicate that the feedback control unit 144 selects the second detection voltage V2 as the feedback signal FB. Reversely, when the selection signal (or the second detection voltage V2) is at a low potential, it indicates that the graphics card 200 is not electrically connected to the power supply 140. In this case, the multiplexer generates a low-potential output signal, to indicate that the feedback control unit 144 selects the first detection voltage V1 as the feedback signal FB.

Figure 2:
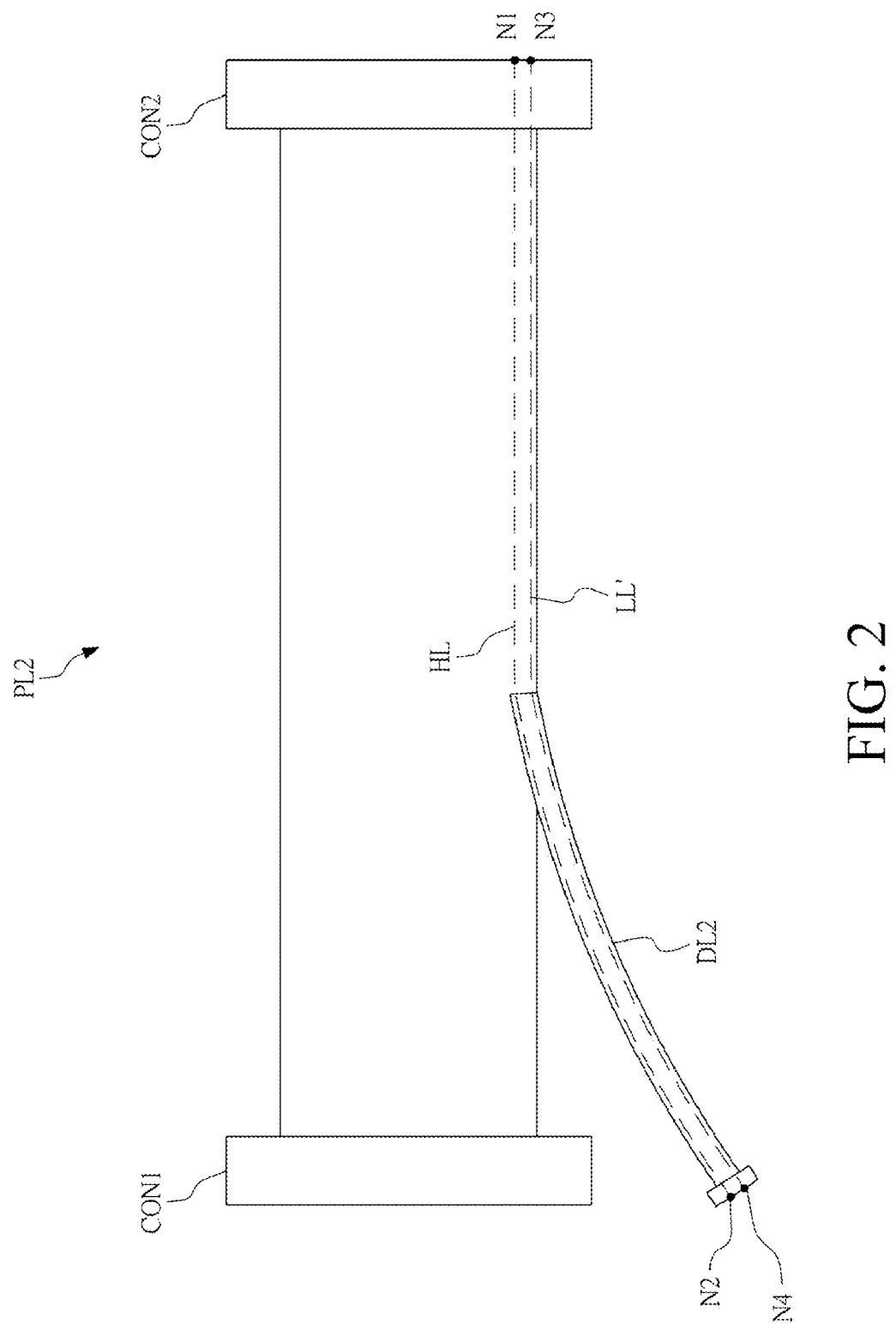
FIG. 2 is a schematic diagram of a second power line according to an embodiment of the disclosure.

Referring to FIG. 2 together, FIG. 2 is a schematic diagram of a second power line PL2 according to an embodiment of the disclosure.

In an embodiment, as shown in the figure, the second power line PL2 includes a first connector CON1 and a second connector CON2, which are respectively adapted to be electrically coupled to power connectors on the power supply 140 and the graphics card 200 (not shown in the figure). The second power line PL2 further includes a detection line DL2. The detection line DL2 includes a high-voltage signal line HL and a low-voltage signal line LL. One end of the high-voltage signal line HL is electrically coupled to a power supply contact N1 of the second connector CON2, and another end of the high-voltage signal line HL is a signal output end N2. One end of the low-voltage signal line LL is electrically coupled to a ground contact N3 of the second connector CON2, and another end of the low-voltage signal line LL is a ground output end N4. A potential difference between the signal output end N2 and the ground output end N4 corresponds to the second detection voltage V2. The second feedback input end 1444 of the feedback control unit 144 is electrically coupled to the signal output end N2 and the ground output end N4 to receive the second detection voltage V2.

Figure 3:
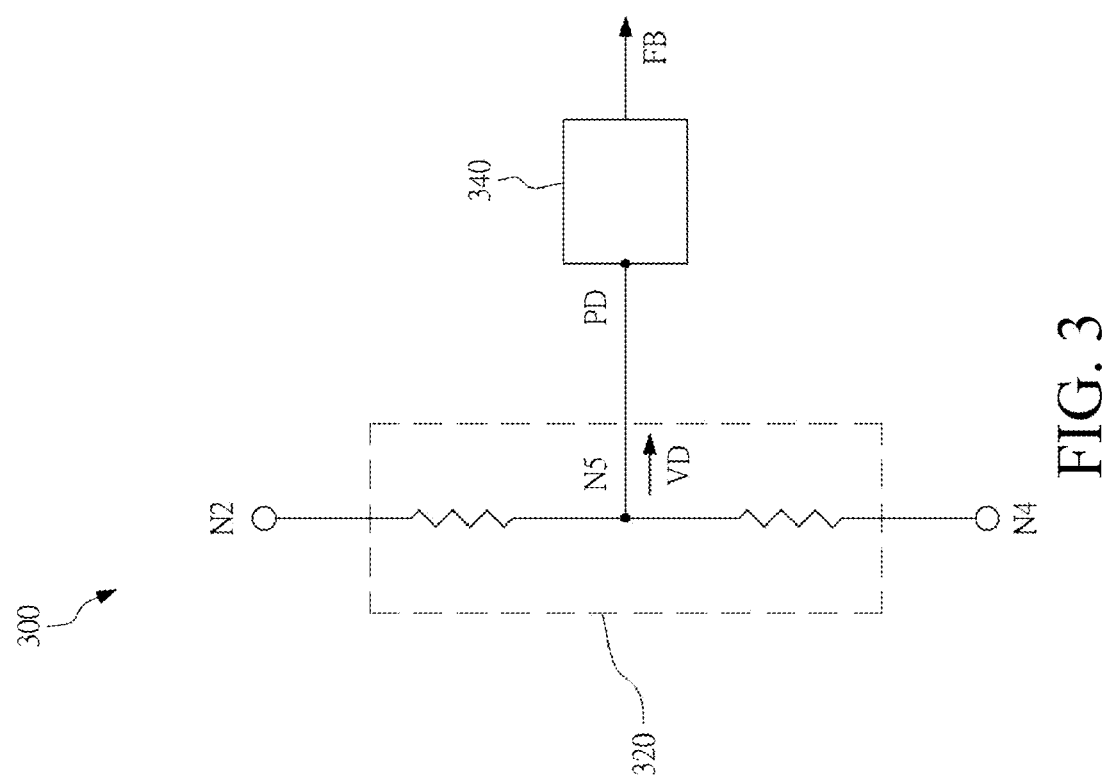
FIG. 3 is a schematic diagram of a feedback control unit according to an embodiment of the disclosure.

Referring to FIG. 3 together, FIG. 3 is a schematic diagram of a feedback control unit 300 according to an embodiment of the disclosure. The feedback control unit 300 is controlled digitally.

In an embodiment, the feedback control unit 300 includes a voltage dividing resistor 320 and a control circuit 340.

The voltage dividing resistor 320 is connected in series between the signal output end N2 and the ground output end N4 of the detection line DL2, and includes a voltage dividing output end N5.

The control circuit 340 includes a detection pin PD electrically coupled to the voltage dividing output end N5. The control circuit 340 selectively generates, according to a voltage dividing level VD received from the voltage dividing output end N5, the feedback signal FB according to the first detection voltage V1 or the second detection voltage V2. In an embodiment, the control circuit 340 is an LLC controller. In an embodiment, the voltage dividing level VD is used as the second detection voltage V2.

When the graphics card 200 is electrically coupled to the power supply 140 through the second power line PL2, the control circuit 340 detects that the voltage dividing level VD is a high-potential signal through the detection pin PD, indicating that feedback compensation needs to be performed according to the second detection voltage V2. Reversely, when the graphics card 200 is not electrically coupled to the power supply 140 through the second power line PL2, the control circuit 340 detects that the voltage dividing level VD is a low-potential signal through the detection pin PD, indicating that feedback compensation is not performed according to the second detection voltage V2. In this case, feedback compensation is instead performed according to the first detection voltage V1.

Figure 4:
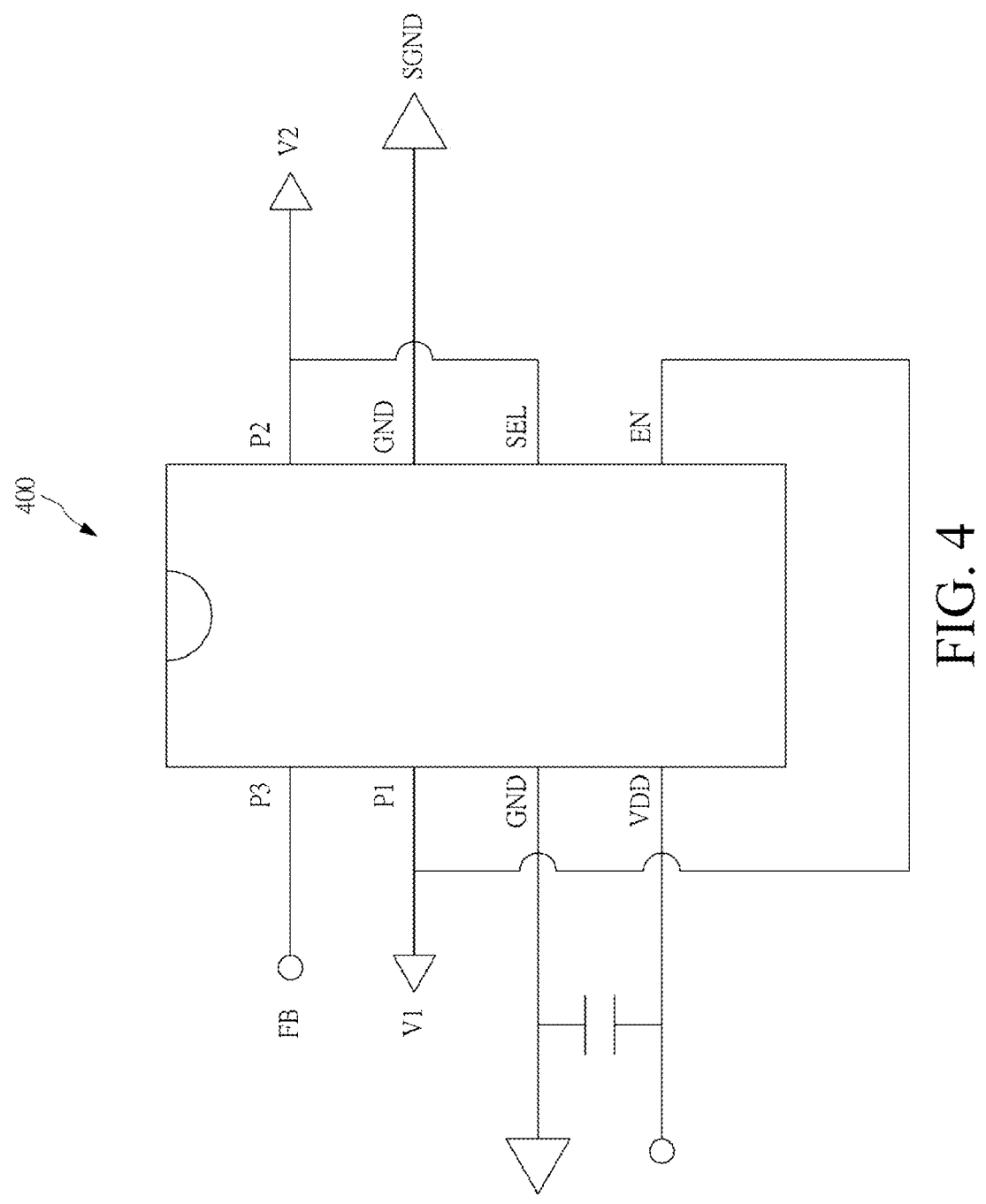
FIG. 4 is a schematic diagram of a feedback control unit according to another embodiment of the disclosure.

Referring to FIG. 4 together, FIG. 4 is a schematic diagram of a feedback control unit 400 according to another embodiment of the disclosure. The feedback control unit 400 is controlled in a manner of simulating switching of a switch.

As shown in the figure, the feedback control unit 400 includes a first feedback input end P1, a second feedback input end P2, and a feedback output end P3. The first feedback input end P1 is adapted to be electrically coupled to the first power line PL1 to receive the first detection voltage V1, and the first detection voltage V1 is simultaneously inputted into an enable pin EN of the feedback control unit 400. The second feedback input end P2 is adapted to be electrically connected to the second power line PL2 to receive the second detection voltage V2, and the second detection voltage V2 is simultaneously inputted into a selection pin SEL of the feedback control unit 400.

When the enable pin EN and the selection pin SEL both receive high-potential signals, the feedback control unit 400 selects the second detection voltage V2, and generates the feedback signal FB at the feedback output end P3 according to the second detection voltage V2. Reversely, when only the enable pin EN receives a high-potential signal, and the selection pin SEL receives a low-potential signal, the feedback control unit 400 generates the feedback signal FB at the feedback output end P3 according to the first detection voltage V1.

Figure 5A:
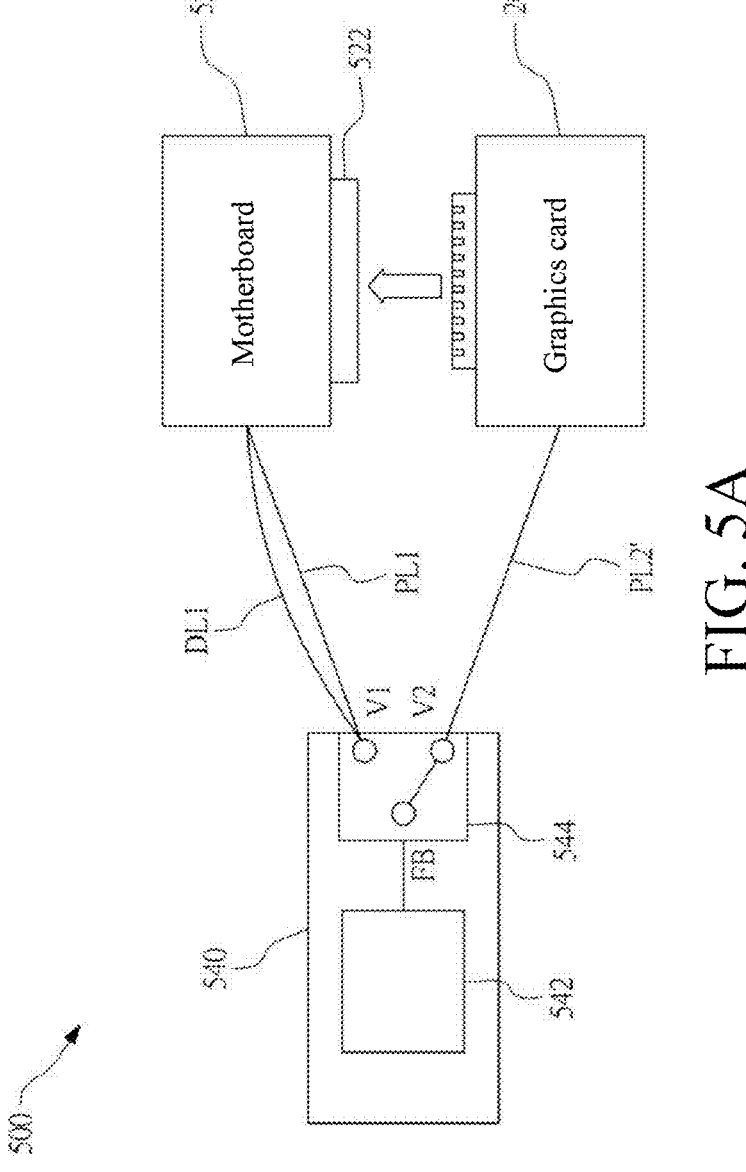
FIG. 5A and FIG. 5B are schematic block diagrams of a computer host according to another embodiment of the disclosure.
Figure 5B:
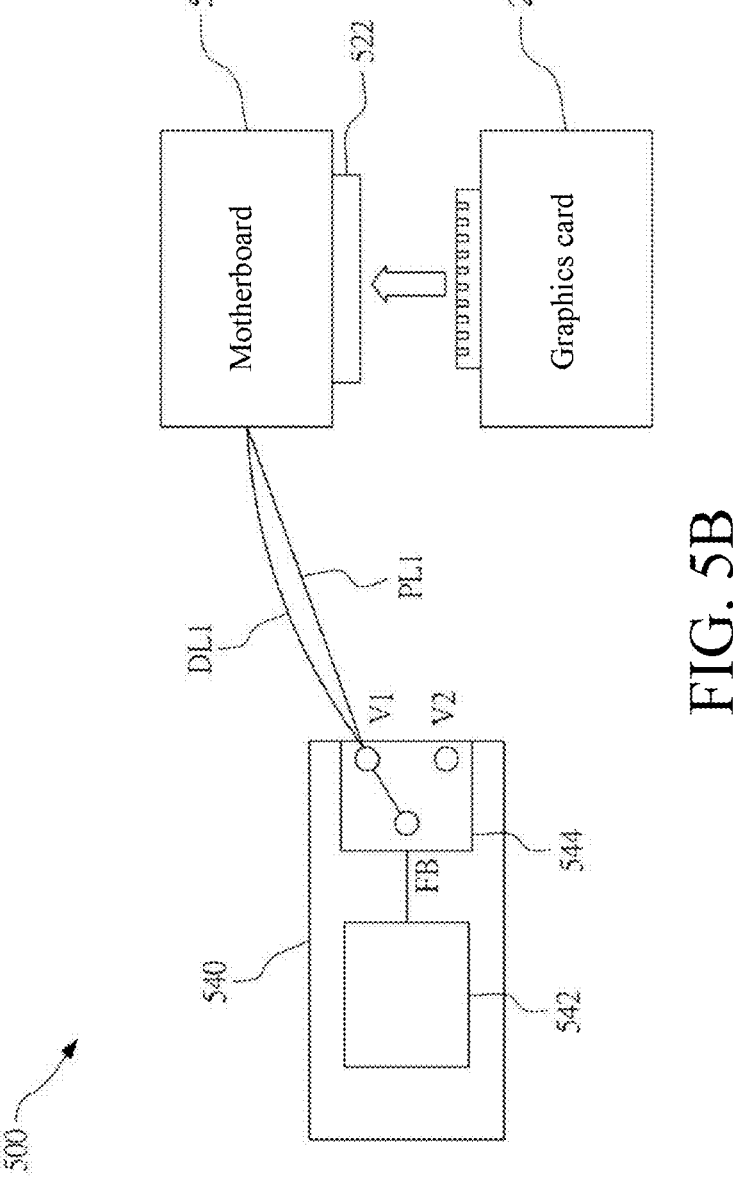

FIG. 5A and FIG. 5B are schematic block diagrams of a computer host 500 according to another embodiment of the disclosure.

Compared to the embodiments shown in FIG. 1A and FIG. 1B, a feedback control unit 544 of a power supply 540 in this embodiment determines an electrical coupling state between a second power line PL2' and the graphics card 200 by detecting a sideband signal on the second power line PL2', without using the second power line PL2 having the additional detection line DL2 shown in FIG. 2.

In the figure, a detection line DL1 is connected between the power supply 540 and a motherboard 520. The detection line DL1 is electrically coupled to the first power line PL1.

As shown in FIG. 5A, when the first power line PL1 and the second power line PL2' are respectively and correctly connected to the motherboard 520 and the graphics card 200 to supply power, the feedback control unit 544 of the power supply 540 determines that the second power line PL2' is connected to the graphics card 200 through the sideband signal transmitted on the second power line PL2', and selects to generate the feedback signal FB according to the second detection voltage V2 and provides the feedback signal FB to the rectifying element 542 for compensation.

Reversely, as shown in FIG. 5B, when only the first power line PL1 is connected to the motherboard 520 to supply power, the feedback control unit 544 determines that the second power line PL2' is not connected to the graphics card 200 by detecting the sideband signal, and the feedback control unit 544 instead selects to generate the feedback signal FB according to the first detection voltage V1 for compensation.

Figure 6:
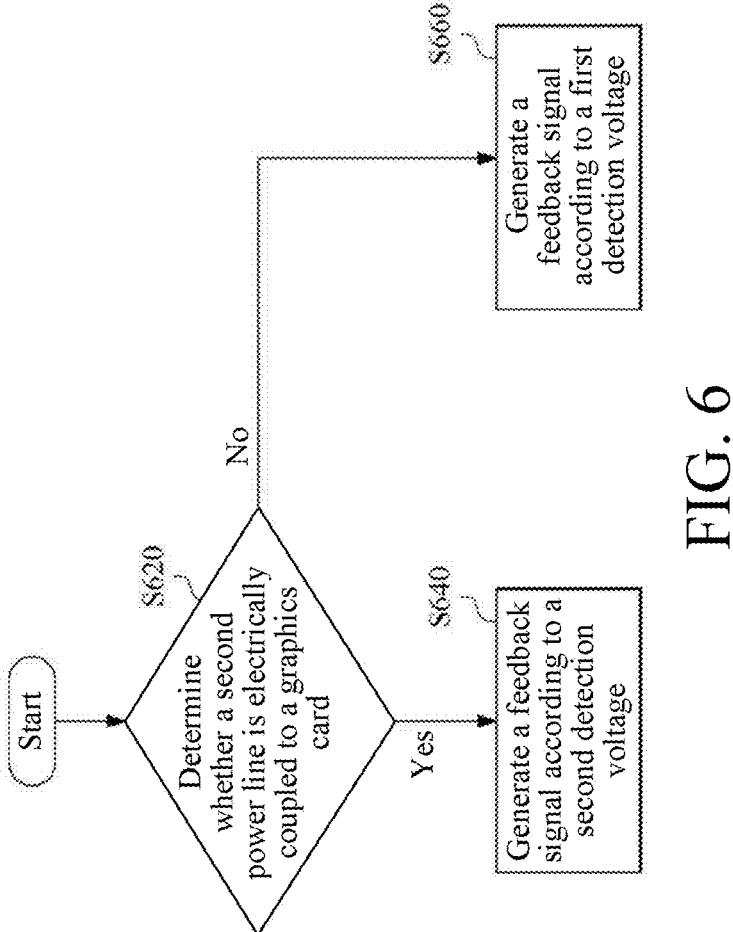
FIG. 6 is a flowchart of a power control method according to an embodiment of the disclosure.

FIG. 6 is a flowchart of a power control method according to an embodiment of the disclosure. The power control method is applicable to the computer host 100 and the computer host 500 shown in FIG. 1A and FIG. 5A, and includes the following steps.

First, as described in determination step S620, whether the second power line PL2 is electrically coupled to the graphics card 200 is determined. For example, the determination step is implemented through the detection method described in the embodiments of FIG. 1A to FIG. 5B.

When it is determined through the determination step S620 that the second power line PL2 is electrically connected to the graphics card 200, as described in step S640, a feedback signal FB is generated according to the second detection voltage V2, so as to control the rectifying element 142 to generate output power corresponding to the second detection voltage V2.

Reversely, when it is determined through the determination step S620 that the second power line PL2 is not electrically connected to the graphics card 200, as described in step S660, a feedback signal FB is generated according to the first detection voltage V1, so as to control the rectifying element 142 to generate output power corresponding to first detection voltage V1.

Figure 7:
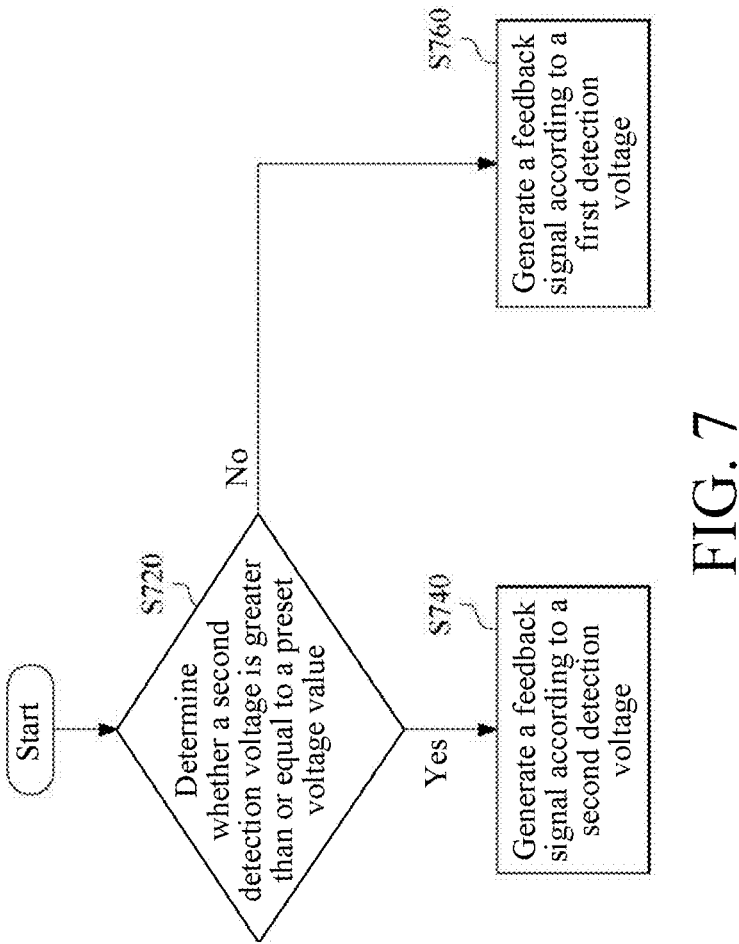
FIG. 7 is a flowchart of a power control method according to another embodiment of the disclosure.

FIG. 7 is a flowchart of a power control method according to another embodiment of the disclosure. The power control method is applicable to the computer host 100 shown in FIG. 1A, and includes the following steps.

First, as described in determination step S720, whether the second detection voltage V2 is greater than or equal to a preset voltage value is determined. For example, the determination step is implemented through the detection method described in the embodiments of FIG. 1A to FIG. 4.

In an embodiment, a magnitude of the preset voltage value corresponds to a proportional relationship between the second detection voltage V2 and an output voltage of the power supply 140. In an embodiment, when the output voltage of the power supply 140 is 12V, the output voltage is reduced to $3/13$ of the original value through the voltage dividing resistor to generate the second detection voltage V2, and the preset voltage value is set to 3V.

When the first detection voltage V1 and the second detection voltage V2 are both greater than the preset voltage value, it indicates that the second power line PL2 is correctly electrically coupled to the graphics card 200. In this case, the process proceeds to step S740 of generating a feedback signal FB according to the second detection voltage V2, so as to control the rectifying element 142 to generate output power corresponding to the second detection voltage V2.

Reversely, when the second detection voltage V2 is less than the preset voltage value, it indicates that the second power line PL2 is not electrically coupled to the graphics card 200. In this case, the process proceeds to step S760 of generating a feedback signal FB according to the first detection voltage V1, so as to control the rectifying element 142 to generate output power corresponding to the first detection voltage V1.

According to the computer host and the power control method provided in the disclosure, the feedback control unit 144 or 544 of the power supply 140 or 540 determines, according to whether the power supply 140 or 540 is electrically coupled the graphics card 200, whether to generate the feedback signal FB according to the first detection voltage V1 or the second detection voltage V2. In this way, the problems of a poor voltage stability of the graphics card 200 and a poor stability of a computer system that are easily caused in the conventional control manner are alleviated.

Although the disclosure has been described with reference to the above embodiments, the embodiments are not intended to limit the disclosure. A person of ordinary skill in the art may make variations and improvements without departing from the spirit and scope of the disclosure. Therefore, the protection scope of the disclosure should be subject to the claims.

What is claimed is:

1. A computer host, suitable for installing a graphics card, wherein the computer host comprises:

a motherboard, comprising a graphics card slot suitable for insertion of the graphics card; and a power supply, adapted to supply power to the motherboard through a first power line and supply power to the graphics card through a second power line, and further comprising:

a rectifying element, adapted to control the power supply to generate output power according to a feedback signal; and a feedback control unit, comprising a first feedback input end and a second feedback input end, wherein the first feedback input end is adapted to be electrically coupled to the first power line to receive a first detection voltage, the second feedback input end is adapted to be electrically coupled to the second power line to receive a second detection voltage, and the feedback control unit selectively generates, according to an electrical coupling state between the power supply and the graphics card, the feedback signal according to the first detection voltage or the second detection voltage.

2. The computer host according to claim 1, wherein the graphics card slot is a PCIE slot.

3. The computer host according to claim 1, wherein the second power line is a PCIE power supply line.

4. The computer host according to claim 3, wherein the feedback control unit detects a sideband signal on the second power line, to determine an electrical coupling state between the second power line and the graphics card.

5. The computer host according to claim 1, wherein when the second detection voltage is greater than or equal to a preset voltage value, the feedback control unit generates the feedback signal according to the second detection voltage.

6. The computer host according to claim 1, wherein when the second detection voltage is less than a preset voltage value, the feedback control unit generates the feedback signal according to the first detection voltage.

7. The computer host according to claim 1, wherein the second power line comprises a detection line, the detection line comprises a high-voltage output end and a ground output end, and the second feedback input end is adapted to be electrically coupled to the high-voltage output end and the ground output end to receive the second detection voltage.

8. The computer host according to claim 7, wherein the feedback control unit comprises a voltage dividing resistor and a control circuit, the voltage dividing resistor is connected in series between the high-voltage output end and the ground output end and comprises a voltage dividing output end, and the control circuit is electrically coupled to the voltage dividing output end and selectively generates, according to a voltage dividing level received from the voltage dividing output end, the feedback signal according to the first detection voltage or the second detection voltage.

9. The computer host according to claim 1, wherein the feedback control unit selectively generates, according to an electrical coupling state between the second power line and the graphics card, the feedback signal according to the first detection voltage or the second detection voltage.

10. A power control method, applicable to a computer host, wherein the computer host comprises a motherboard and a power supply, the motherboard comprises a graphics card slot suitable for insertion of a graphics card, the power supply is adapted to supply power to the motherboard through a first power line and supply power to the graphics card through a second power line, the power supply comprises a rectifying element and a feedback control unit, the rectifying element controls the power supply to generate output power according to a feedback signal, the feedback control unit comprises a first feedback input end and a second feedback input end, the first feedback input end is adapted to be electrically coupled to the first power line to receive a first detection voltage, the second feedback input end is adapted to be electrically coupled to the second power line to receive a second detection voltage, and the power control method comprises:

determining whether the second power line is electrically coupled to the graphics card;

when it is determined that the second power line is electrically coupled to the graphics card, generating the feedback signal according to the second detection voltage; and when it is determined that the second power line is not electrically coupled to the graphics card, generating the feedback signal according to the first detection voltage.

11. The power control method according to claim 10, wherein the graphics card slot is a PCIE slot, and the second power line is a PCIE power supply line.

12. The power control method according to claim 10, further comprising:

when the second detection voltage is greater than or equal to a preset voltage value, generating the feedback signal according to the second detection voltage.

13. The power control method according to claim 10, further comprising:

when the second detection voltage is less than a preset voltage value, generating the feedback signal according to the first detection voltage.

\* \* \* \* \*